(12) United States Patent
Balmakhtar et al.

(10) Patent No.: US 12,696,089 B2
(45) Date of Patent: *Jul. 28, 2026

(54) WIRELESS NETWORK SLICE ACCESS BASED ON ENCRYPTED SLICE CERTIFICATES THAT INDICATE SLICE CHARACTERISTICS

(71) Applicant: T-MOBILE INNOVATIONS LLC, Overland Park, KS (US)

(72) Inventors: Marouane Balmakhtar, Fairfax, VA (US); Lyle Walter Paczkowski, Mission Hills, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 57 days.

This patent is subject to a terminal disclaimer.

(21) Appl. No.: 18/777,160

(22) Filed: Jul. 18, 2024

(65) Prior Publication Data

US 2024/0373223 A1 Nov. 7, 2024

Related U.S. Application Data

(63) Continuation of application No. 17/690,906, filed on Mar. 9, 2022, now Pat. No. 12,075,245.

(51) Int. Cl.
H04W 12/069 (2021.01)
H04W 8/20 (2009.01)
H04W 12/08 (2021.01)

(52) U.S. Cl.
CPC .......... H04W 12/069 (2021.01); H04W 8/20 (2013.01); H04W 12/08 (2013.01)

(58) Field of Classification Search
CPC ... H04W 12/08; H04W 12/03; H04W 12/069; H04W 8/20
See application file for complete search history.

(56) References Cited

U.S. PATENT DOCUMENTS

| | | | |
|---|---|---|---|
| 8,965,939 B2 | 2/2015 | Leggette et al. | |
| 10,255,135 B2 | 4/2019 | Resch et al. | |
| 10,411,964 B2 | 9/2019 | Zhang | |
| 10,506,506 B2 | 12/2019 | Qiao et al. | |
| 10,616,934 B2 | 4/2020 | Talebi Fard et al. | |
| 10,735,956 B2 | 8/2020 | Bae et al. | |
| 10,896,102 B2 | 1/2021 | Doshi et al. | |
| 10,949,557 B2 | 3/2021 | Patil et al. | |

(Continued)

FOREIGN PATENT DOCUMENTS

| | | |
|---|---|---|
| WO | 2017200978 A1 | 11/2017 |
| WO | 2018075930 A1 | 4/2018 |

(Continued)

*Primary Examiner* — Hosuk Song

(57) ABSTRACT

A wireless communication device generates a slice certificate having one or more slice characteristics for a wireless network slice. The wireless communication device encrypts the slice certificate with a wireless network key. The wireless communication device wirelessly transfers the encrypted slice certificate to a wireless access node, and in response, wirelessly receives user context for the wireless network slice from the wireless access node. The wireless communication device wirelessly exchanges wireless network slice data with the wireless access node based on the user context for the wireless network slice.

20 Claims, 10 Drawing Sheets

(56)         References Cited

U.S. PATENT DOCUMENTS

| | | | |
|---|---|---|---|
| 10,951,622 B2 | 3/2021 | Heintel et al. | |
| 11,122,439 B2 | 9/2021 | Wang et al. | |
| 11,356,421 B2 * | 6/2022 | Saghir | H04W 12/71 |
| 11,418,955 B2 | 8/2022 | Marinho et al. | |
| 11,595,387 B2 | 2/2023 | Paczkowski et al. | |
| 11,689,367 B2 * | 6/2023 | Ying | H04L 9/30 |
| | | | 455/411 |
| 11,711,401 B2 * | 7/2023 | Solari | H04W 12/06 |
| | | | 726/3 |
| 11,716,627 B2 | 8/2023 | Saroiu et al. | |
| 11,836,350 B1 | 12/2023 | Chopra et al. | |
| 11,868,498 B1 * | 1/2024 | Resch | G06F 21/602 |
| 12,015,646 B2 * | 6/2024 | Saroiu | H04L 63/20 |
| 12,061,522 B2 * | 8/2024 | Acharya | G06F 11/1464 |
| 12,075,245 B2 * | 8/2024 | Balmakhtar | H04W 12/03 |
| 2019/0387401 A1 | 12/2019 | Liao et al. | |
| 2021/0195509 A1 | 6/2021 | Ohlsson et al. | |
| 2021/0289351 A1 | 9/2021 | Ferdi et al. | |
| 2021/0289359 A1 | 9/2021 | Zhang et al. | |
| 2021/0329452 A1 | 10/2021 | Ito et al. | |
| 2023/0049987 A1 * | 2/2023 | Qiu | H04W 12/069 |

FOREIGN PATENT DOCUMENTS

| | | | |
|---|---|---|---|
| WO | 2020254301 A1 | 12/2020 | |
| WO | 2022009156 A1 | 1/2022 | |

* cited by examiner

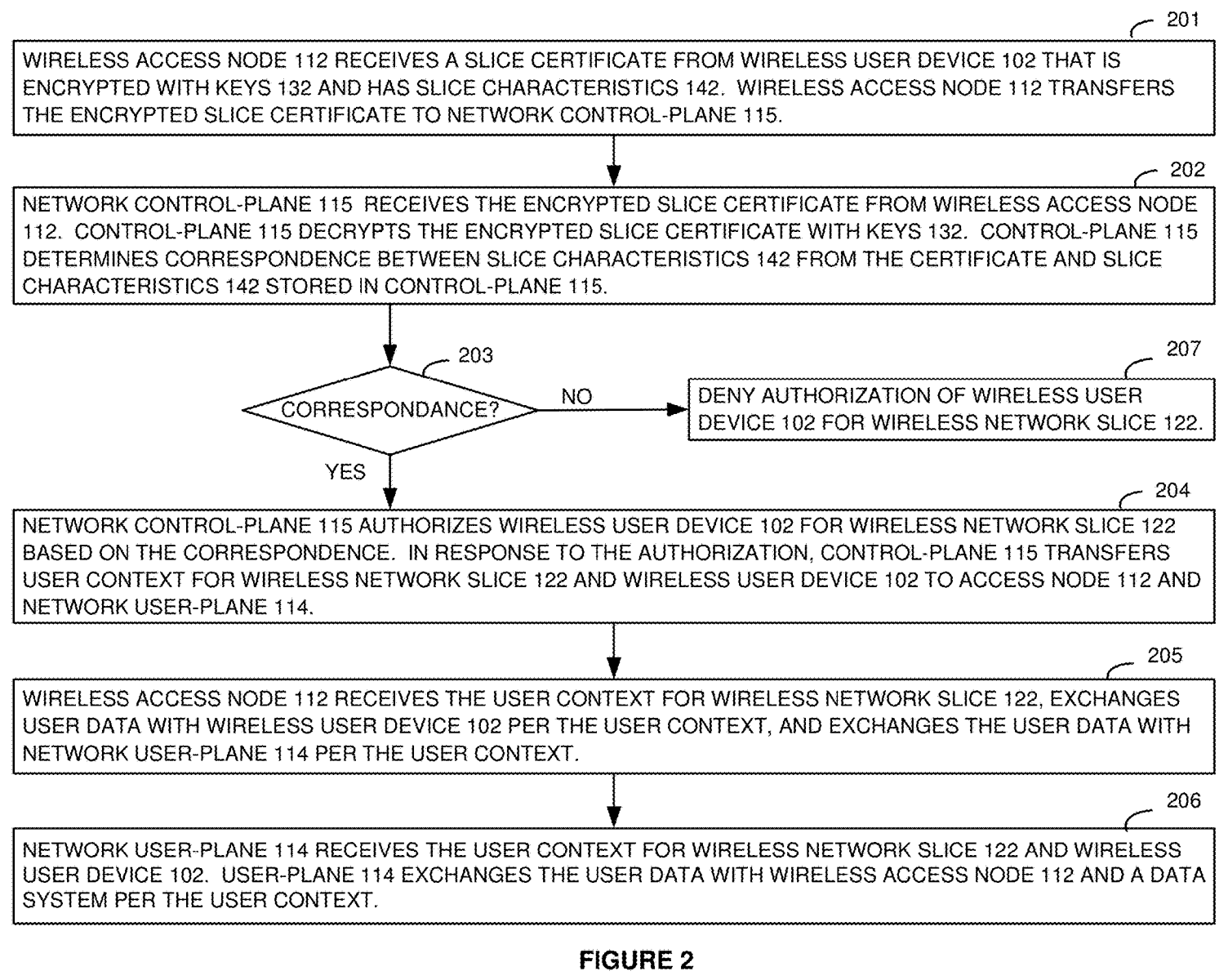

201 — WIRELESS ACCESS NODE 112 RECEIVES A SLICE CERTIFICATE FROM WIRELESS USER DEVICE 102 THAT IS ENCRYPTED WITH KEYS 132 AND HAS SLICE CHARACTERISTICS 142. WIRELESS ACCESS NODE 112 TRANSFERS THE ENCRYPTED SLICE CERTIFICATE TO NETWORK CONTROL-PLANE 115.

202 — NETWORK CONTROL-PLANE 115 RECEIVES THE ENCRYPTED SLICE CERTIFICATE FROM WIRELESS ACCESS NODE 112. CONTROL-PLANE 115 DECRYPTS THE ENCRYPTED SLICE CERTIFICATE WITH KEYS 132. CONTROL-PLANE 115 DETERMINES CORRESPONDENCE BETWEEN SLICE CHARACTERISTICS 142 FROM THE CERTIFICATE AND SLICE CHARACTERISTICS 142 STORED IN CONTROL-PLANE 115.

203 — CORRESPONDANCE?

207 — DENY AUTHORIZATION OF WIRELESS USER DEVICE 102 FOR WIRELESS NETWORK SLICE 122.

NO

YES

204 — NETWORK CONTROL-PLANE 115 AUTHORIZES WIRELESS USER DEVICE 102 FOR WIRELESS NETWORK SLICE 122 BASED ON THE CORRESPONDENCE. IN RESPONSE TO THE AUTHORIZATION, CONTROL-PLANE 115 TRANSFERS USER CONTEXT FOR WIRELESS NETWORK SLICE 122 AND WIRELESS USER DEVICE 102 TO ACCESS NODE 112 AND NETWORK USER-PLANE 114.

205 — WIRELESS ACCESS NODE 112 RECEIVES THE USER CONTEXT FOR WIRELESS NETWORK SLICE 122, EXCHANGES USER DATA WITH WIRELESS USER DEVICE 102 PER THE USER CONTEXT, AND EXCHANGES THE USER DATA WITH NETWORK USER-PLANE 114 PER THE USER CONTEXT.

206 — NETWORK USER-PLANE 114 RECEIVES THE USER CONTEXT FOR WIRELESS NETWORK SLICE 122 AND WIRELESS USER DEVICE 102. USER-PLANE 114 EXCHANGES THE USER DATA WITH WIRELESS ACCESS NODE 112 AND A DATA SYSTEM PER THE USER CONTEXT.

FIGURE 2

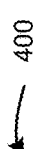
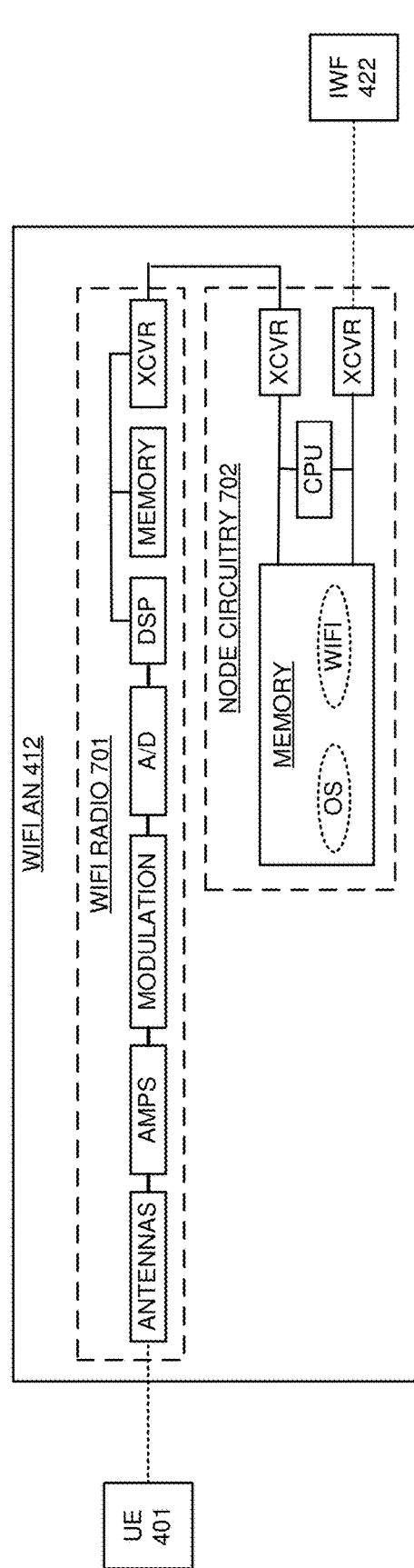
FIGURE 7

WIRELESS NETWORK SLICE ACCESS BASED ON ENCRYPTED SLICE CERTIFICATES THAT INDICATE SLICE CHARACTERISTICS

RELATED CASES

This United States Patent Application is a continuation of U.S. patent application Ser. No. 17/690,906 that was filed on Mar. 9, 2022 and is entitled "WIRELESS NETWORK SLICE ACCESS BASED ON ENCRYPTED SLICE CER-TIFICATES THAT INDICATE SLICE CHARACTERIS-TICS." U.S. patent application Ser. No. 17/690,906 is hereby incorporated by reference into this United States Patent Application.

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smart-phone may execute a social-networking application that communicates with a content server over a wireless com-munication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless network elements comprise Access and Mobility Manage-ment Functions (AMFs), Session Management Functions (SMF), User Plane Functions (UPFs), and the like. In some cases, the wireless network elements are grouped in wireless network slices that deliver specific services like massive Machine Type Communication (mMTC), Ultra Reliable Low Latency Communication (URLLC), and enhanced Mobile Broadband (eMBB). For example, an SMF and UPF may be optimized to deliver the mMTC service.

A wireless communication network authenticates a wire-less user device before delivering non-emergency service. Typically, the authentication is based on a secret code that is stored in the wireless user device and the wireless commu-nication network. The wireless user device hashes the secret code with a random number to generate a result. The wireless communication network hashes the secret code with the same random number to generate the same result The wireless communication network matches the results to authenticate the wireless user device. The wireless commu-nication network then authorizes the authenticated wireless user device for a wireless network slice by accessing various user databases. The wireless communication network then selects user context to deliver the wireless network slice to the authenticated wireless user device.

Unfortunately, the wireless communication networks do not efficiently authenticate and authorize wireless user devices to use wireless network slices. Moreover, the wireless communication networks do not effectively deploy multiple slices that serve various types of wireless user devices.

TECHNICAL OVER VIEW

In some examples, a method comprises the following operations. Generate a slice certificate having one or more slice characteristics for a wireless network slice. Encrypt the slice certificate with a wireless network key. Wirelessly transfer the encrypted slice certificate to a wireless access node, and in response, wirelessly receive user context for the wireless network slice from the wireless access node. Wire-lessly exchange wireless network slice data with the wireless access node based on the user context for the wireless network slice.

In some examples, a method of operating a sensor to use a massive Machine Type Communication (mMTC) network slice comprises the following operations. Wirelessly transfer encrypted mMTC slice characteristics for the mMTC net-work slice to a wireless communication network that decrypts and validates the encrypted mMTC slice charac-teristics, and in response, wirelessly transfers user context for the mMTC wireless network slice to the sensor. Wire-lessly receive the user context for the mMTC network slice from the wireless communication network. Wirelessly trans-fer sensor data to the mMTC network slice over the wireless communication network based on the user context.

In some examples, a wireless communication device comprises a data processing system and a radio. The data processing system is to generate a slice certificate having one or more slice characteristics for a wireless network slice. The data processing system is to encrypt the slice certificate with a wireless network key. The radio is to wirelessly transfer the encrypted slice certificate to a wireless access node, and in response, wirelessly receive user context for the wireless network slice from the wireless access node. The radio is to wirelessly exchange wireless network slice data with the wireless access node based on the user context for the wireless network slice.

DESCRIPTION OF THE DRAWINGS

FIG. 2 illustrates an exemplary operation of the wireless communication network to serve the wireless user devices over the wireless network slices that have the encrypted slice certificates that indicate the slice characteristics.

FIG. 7 illustrates an exemplary IEEE 802.11 (WIFI) AN in the 5G communication network.

DETAILED DESCRIPTION

Figure 1:
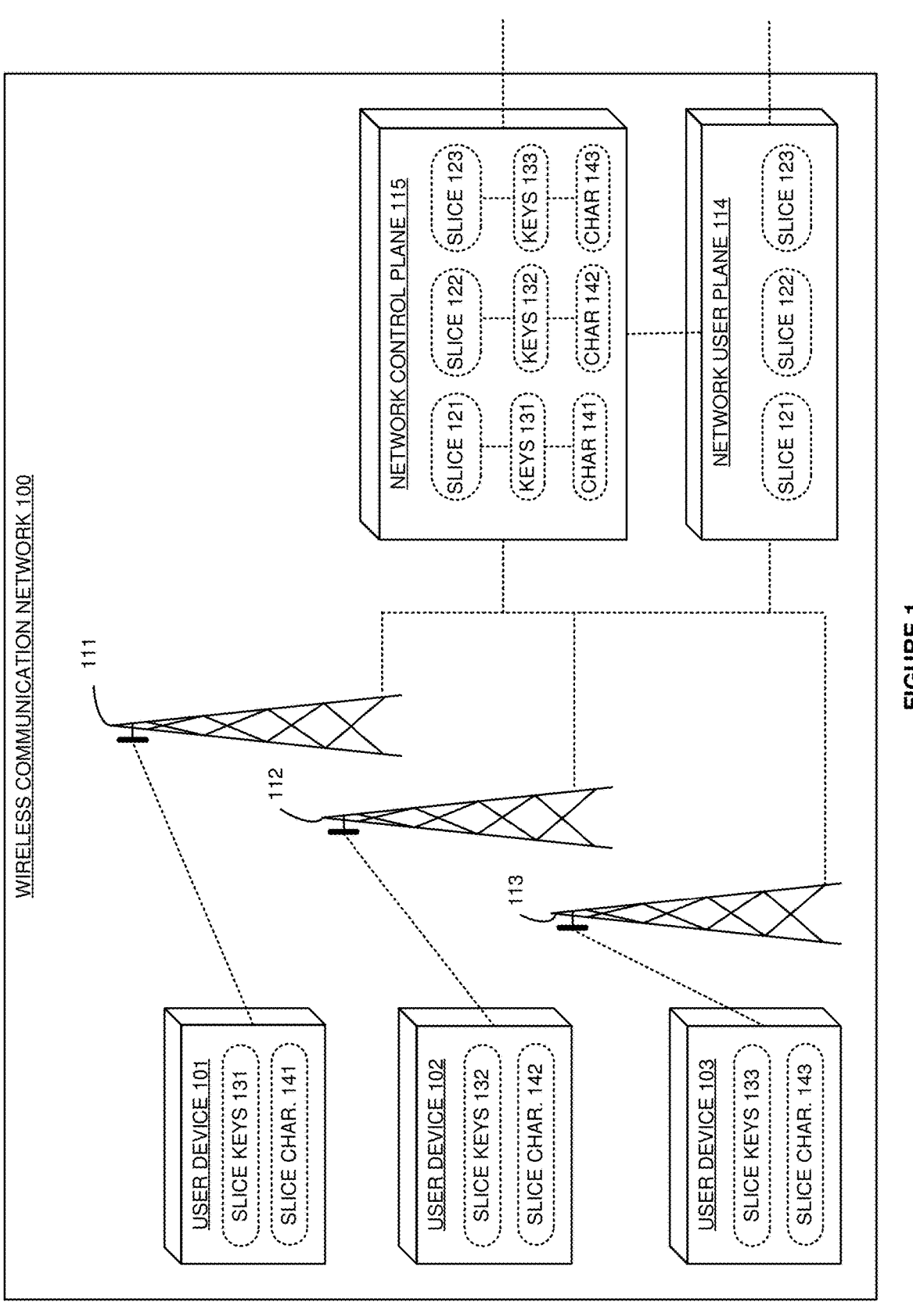
FIG. 1 illustrates an exemplary wireless communication network to serve wireless user devices over a wireless network slices that have encrypted slice certificates that indicate slice characteristics.

FIG. 1 illustrates exemplary wireless communication network 100 to serve wireless user devices 101-103 over wireless network slices 121-123 that have encrypted slice certificates that indicate slice characteristics 131-133. Wireless communication network 100 comprises wireless user devices 101-103, wireless access nodes 111-113, network user-plane 114, and network control plane 115. Network user-plane 114 has wireless network slices 121-123 to serve wireless user devices 101-103 over wireless access nodes 111-113. Network control-plane 115 controls and serves wireless network slices 121-123 based on cryptography keys 131-133 and slice characteristics (CHAR) 141-143. Wireless user devices 101-103 are respectively configured with cryptography keys 131-133 and slice characteristics 141-143. Wireless network slices 121-123 comprise massive Machine Type Communication (mMTC) slices, Ultra Reliable Low Latency Communication (URLLC) slices, enhanced Mobile Broadband (eMBB) slices, and/or some other network slice type. Slice characteristics 141-143 indicate slice identifiers, application identifiers, Radio Access Network (RAN) information, server information, and/or some other characterizing data for wireless network slices 121-123. The slice certificate for slice 121 comprises a digital certificate that is encrypted/decrypted using keys 131 to encrypt/decrypt slice characteristics 141. The slice certificate for slice 122 comprises a digital certificate that is encrypted/decrypted using keys 132 to encrypt/decrypt slice characteristics 142. The slice certificate for slice 123 comprises a digital certificate that is encrypted/decrypted using keys 133 to encrypt/decrypt slice characteristics 143. Wireless user devices 101-103 comprise computers, phones, sensors, vehicles, robots, or some other data appliances with wireless communication circuitry. Exemplary wireless data services that are served to devices 101-103 include sensor telemetry, machine-control, internet-access, media-streaming, social-networking, or some other wireless data product. The number of user devices, access nodes, and slices shown on FIG. 1 is restricted for clarity and wireless communication network 100 typically includes many more devices, nodes, and slices than shown.

Various examples of network operation and configuration are described herein. In some examples, wireless user device 101 encrypts slice characteristics 141 with keys 131 to form a slice certificate for wireless network slice 121. Wireless user device 101 requests slice 121 and transfers the encrypted slice certificate to network control plane 115 over wireless access node 111. Network control-plane 115 receives the encrypted slice certificate from wireless access node 111. Network control-plane 115 decrypts the encrypted slice certificate using keys 131 to identify slice characteristics 141. Network control-plane 115 determines if there is correspondence between slice characteristics 141 from wireless user device 101 and slice characteristics 141 that are stored in network control-plane 115. Based on adequate correspondence, network control-plane 115 authorizes wireless user device 101 for wireless network slice 121. In response to the authorization, network control-plane 115 transfers user context for wireless network slice 131 to wireless access node 111 and network user-plane 114. Wireless access node 111 exchanges user data between wireless user device 101 and network user-plane 114 per the user context. Network user-plane 114 exchanges the user data between wireless access node 111 and an external data system (not shown) per the user context. Advantageously, wireless communication network 100 efficiently authenticates and authorizes wireless user devices 101-103 to use wireless network slices 121-123. Moreover, wireless communication network 100 effectively deploys multiple slices 121-123 that may serve various types of wireless user devices 101-103 that may not support traditional network authentication authorization.

Wireless user devices 101-103 and wireless access nodes 111-112 comprise radios that wirelessly communicate over radio channels or some other wireless communication media. The wireless communications use technologies like Institute of Electrical and Electronic Engineers (IEEE) 802.11 (WIFI), Internet-of-Things (IoT), Bluetooth Low Energy (BLE), Fifth Generation New Radio (5GNR), Long Term Evolution (LTE), Low Power Wide Area Network (LP-WAN), and Ultra-Wide-Band (UWB). Wireless access nodes 111-113, network user-plane 114, and network control-plane 115 communicate over network connections that comprise metallic wiring, glass fibers, radio channels, or some other communication media. The network connections may use WIFI, IoT, Bluetooth, 5GNR, LTE, LP-WAN, UWB, IEEE 802.3 (ETHERNET), Internet Protocol (IP), Time Division Multiplex (TDM), Data Over Cable System Interface Specification (DOCSIS), Synchronous Optical Network (SONET), virtual switching, inter-processor communication, bus interfaces, and/or some other data communication protocols.

Network control-plane 115 comprises Access and Mobility Management Functions (AMFs), Mobility Management Entities (MMEs), Session Management Functions (SMFs), User Data Management (UDMs), Network Slice Selection Functions (NSSFs), and/or some other network controllers. Network user-plane 114 comprises User-Plane Functions (UPFs), Application Servers (AS), Gateways (GWs), Routers (RTRs), and/or some other user-data processors. Wireless user devices 101-103, wireless access nodes 111-113, user-plane 114, and control-plane 115 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, relay applications, network applications, radio applications, and network functions. The microprocessors retrieve the software from the memories and execute the software to drive the operation of wireless communication network 100 as described herein.

FIG. 2 illustrates an exemplary operation of wireless communication network 100 to serve wireless user devices 101-103 over wireless network slices 121-123 that have encrypted slice certificates that indicate slice characteristics 131-133. The operation may vary in other examples. Wireless access node 112 wirelessly receives an encrypted slice certificate from wireless user device 102 (201). The slice certificate is encrypted with keys 132 and indicates slice characteristics 142 for wireless network slice 122. Wireless access node 112 transfers the encrypted slice certificate to network control plane 115 (201). Network control-plane 115 receives the encrypted slice certificate from wireless access node 112. Network control-plane 115 decrypts the encrypted slice certificate using keys 132 to identify slice characteristics 142 for slice 122. Network control-plane 115 determines if there is correspondence between slice characteristics 142 from wireless user device 102 and slice characteristics 142 that are stored in network control-plane 115 (202). Based on positive correspondence (203), network control-plane 115 authorizes wireless user device 102 for wireless network slice 122 (204). In response to the authorization, network control-plane 115 transfers user context for wireless network slice 122 to wireless access node 112 and network user-plane 114 (204). Wireless access node 112 receives the user context for wireless network slice (205) Wireless access node 112 exchanges user data with wireless user device 102 per the user context (205). Wireless access node 112 exchanges the user data with network user-plane 114 per the user context (205). Network user-plane 114 exchanges the user data with wireless access node 112 per the user context (206). Network user-plane 114 exchanges the user data with a data system per the user context (206). When there is a negative correspondence (203), network control-plane 115 denies authorization for wireless user device 102 to wireless network slice 122 (207).

Figure 3:
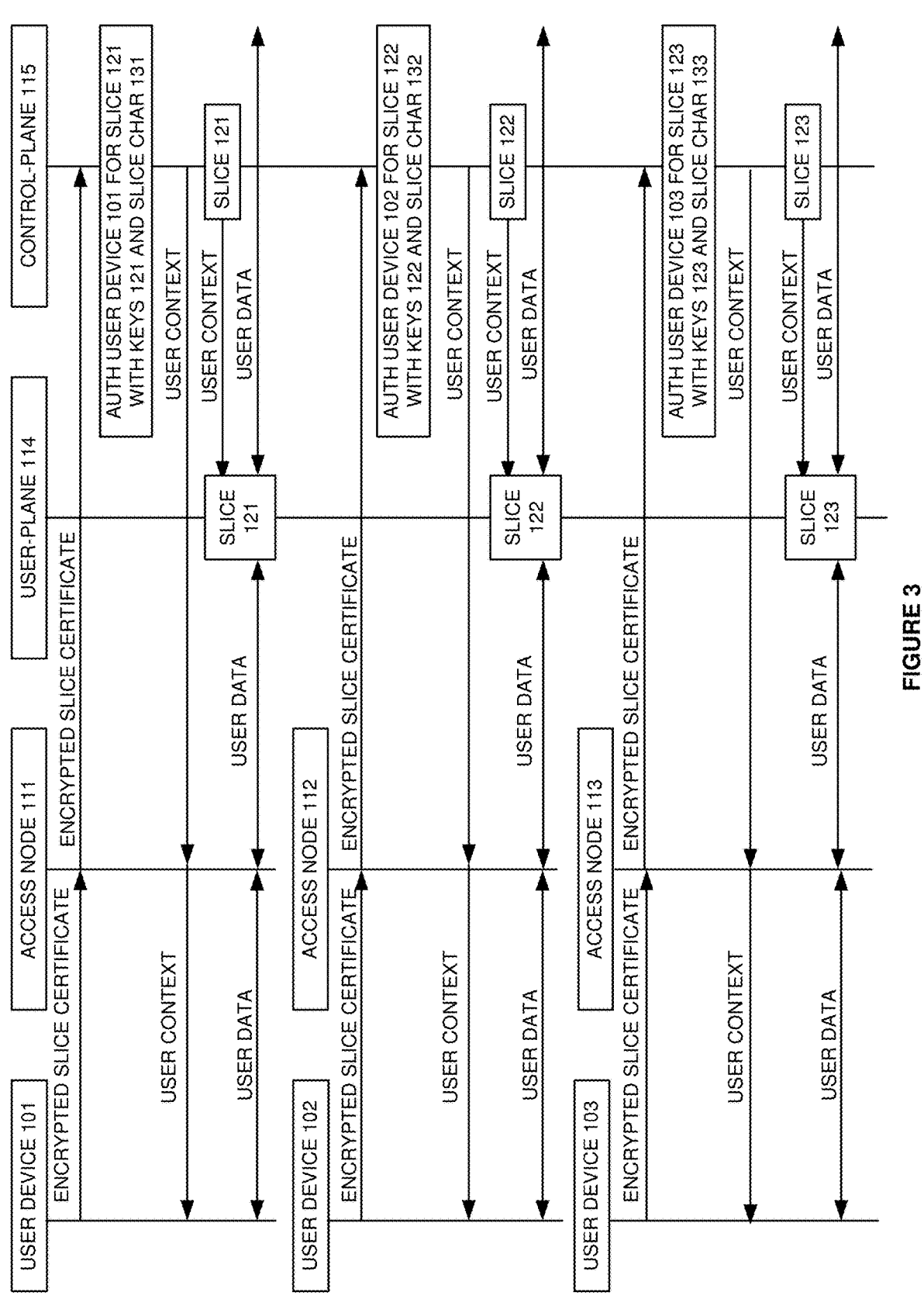
FIG. 3 illustrates an exemplary operation of the wireless communication network to serve the wireless user devices over the wireless network slices that have the encrypted slice certificate that indicate the slice characteristics.

FIG. 3 illustrates an exemplary operation of the wireless communication network to serve wireless user devices 101-103 over wireless network slices 121-123 that have encrypted slice certificates that indicate slice characteristics 131-133. The operation may vary in other examples. Wireless user device 101 encrypts slice characteristics 141 with keys 131 to form a slice certificate for wireless network slice 121. Wireless user device 101 requests slice 121 and transfers the encrypted slice certificate to network control plane 115 over wireless access node 111. Network control-plane 115 receives the encrypted slice certificate from wireless access node 111. Network control-plane 115 decrypts the encrypted slice certificate using keys 131 to identify slice characteristics 141. Network control-plane 115 determines if there is correspondence between slice characteristics 141 from wireless user device 101 and slice characteristics 141 that are stored in network control-plane 115. Based on adequate correspondence, network control-plane 115 authorizes wireless user device 101 for wireless network slice 121. In response to the authorization, network control-plane 115 initiates slice 121 control-plane 115 and user-plane 114. Network control-plane 115 transfers user context for wireless network slice 121 to wireless access node 111 and network user-plane 114. Wireless access node 111 exchanges user data between wireless user device 101 and slice 121 in network user-plane 114 per the user context. Slice 121 in network user-plane 114 exchanges the user data between wireless access node 111 and an external data system per the user context.

Wireless user device 102 encrypts slice characteristics 142 with keys 132 to form a slice certificate for wireless network slice 122. Wireless user device 102 requests slice 122 and transfers the encrypted slice certificate to network control plane 115 over wireless access node 112. Network control-plane 115 receives the encrypted slice certificate from wireless access node 112. Network control-plane 115 decrypts the encrypted slice certificate using keys 132 to identify slice characteristics 142. Network control-plane 115 determines if there is correspondence between slice characteristics 142 from wireless user device 102 and slice characteristics 142 that are stored in network control-plane 115. Based on adequate correspondence, network control-plane 115 authorizes wireless user device 102 for wireless network slice 122. In response to the authorization, network control-plane 115 initiates slice 122 control-plane 115 and user-plane 114. Network control-plane 115 transfers user context for wireless network slice 122 to wireless access node 112 and network user-plane 114. Wireless access node 112 exchanges user data between wireless user device 102 and slice 122 in network user-plane 114 per the user context. Slice 122 in network user-plane 114 exchanges the user data between wireless access node 112 and an external data system per the user context.

Wireless user device 103 encrypts slice characteristics 143 with keys 133 to form a slice certificate for wireless network slice 123. Wireless user device 103 requests slice 123 and transfers the encrypted slice certificate to network control plane 115 over wireless access node 113. Network control-plane 115 receives the encrypted slice certificate from wireless access node 113. Network control-plane 115 decrypts the encrypted slice certificate using keys 133 to identify slice characteristics 143. Network control-plane 115 determines if there is correspondence between slice characteristics 143 from wireless user device 103 and slice characteristics 143 that are stored in network control-plane 115. Based on adequate correspondence, network control-plane 115 authorizes wireless user device 103 for wireless network slice 123. In response to the authorization, network control-plane 115 initiates slice 123 control-plane 115 and user-plane 114. Network control-plane 115 transfers user context for wireless network slice 123 to wireless access node 113 and network user-plane 114. Wireless access node 113 exchanges user data between wireless user device 103 and slice 123 in network user-plane 114 per the user context. Slice 123 in network user-plane 114 exchanges the user data between wireless access node 113 and an external data system per the user context.

Figure 4:
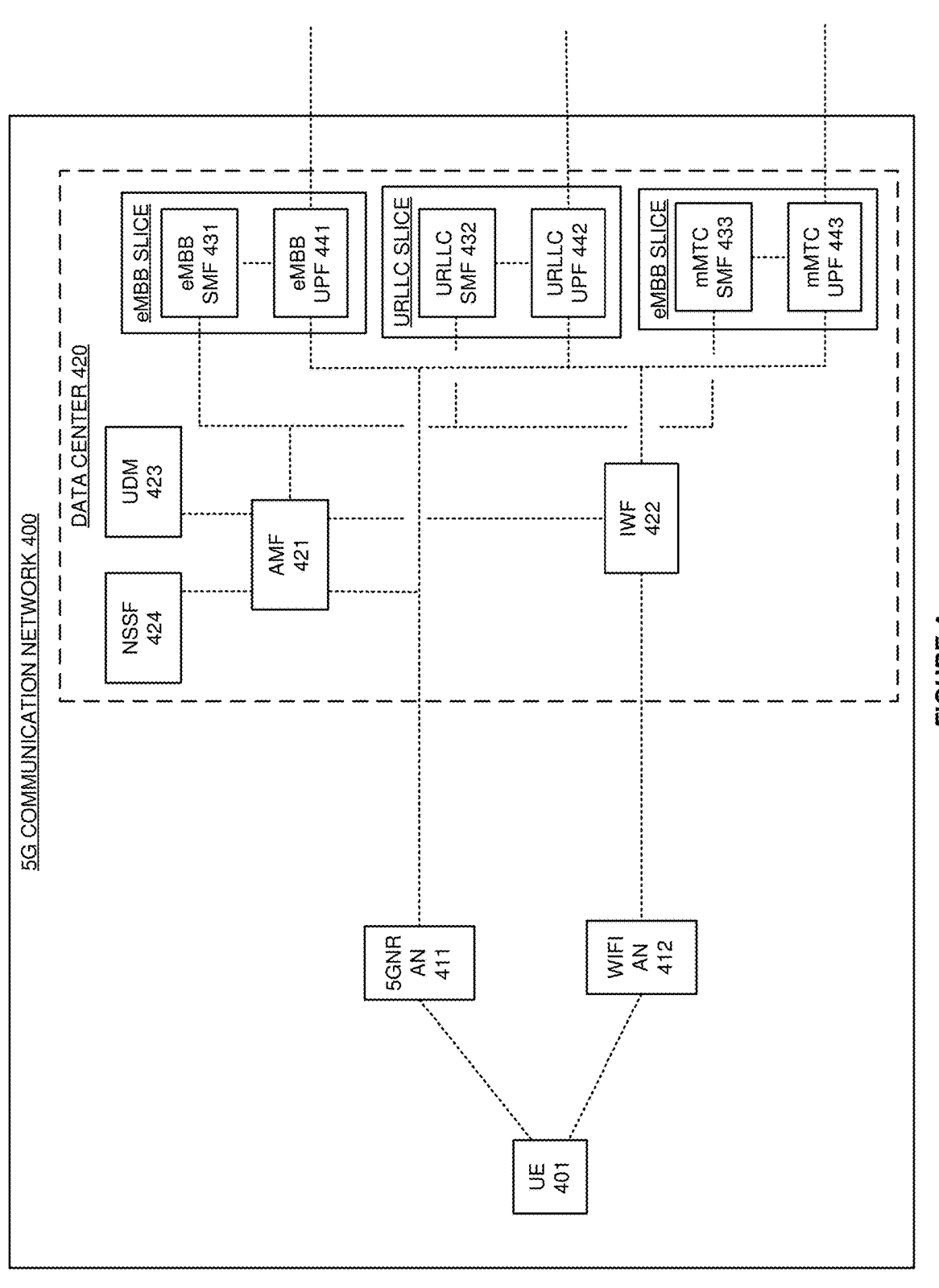
FIG. 4 illustrates an exemplary Fifth Generation (5G) communication network to serve a wireless User Equipment (UE) over wireless network slices that have encrypted slice certificates that indicate slice characteristics.

FIG. 4 illustrates an exemplary Fifth Generation (5G) communication network 400 to serve wireless User Equipment (UE) 401 over wireless network slices that have encrypted slice certificates that indicate slice characteristics. 5G communication network 400 comprises an example of wireless communication network 100, although network 100 may differ. 5G communication network 400 comprises: wireless UE 401, 5GNR Access Node (AN) 411, WIFI AN 402, and network data center 420. Network data center 420 comprises Access and Mobility Management Function (AMF) 421, Interworking Function (IWF) 422, Unified Data Management (UDM) 423, Network Slice Selection Function (NSSF) 424, Session Management Functions (SMFs) 431-433, and User Plane Functions (UPFs) 441-443. Data center 420 is simplified for clarity and typically includes additional network elements like Network Repository Function (NRF) and Application Function (AF). An enhanced Mobile Broadband (eMBB) slice comprises eMBB SMF 431 and eMBB UPF 441. An Ultra Reliable Low Latency Communication (URLLC) slice comprises URLLC SMF 432 and URLLC UPF 442. A massive Machine Type Communication (mMTC) slice comprises mMTC SMF 433 and mMTC UPF 443.

Wireless UE 401 is configured with slice certificates that encrypt slice characteristics for the eMBB slice, URLLC slice, and mMTC slice. UE 401 registers with AMF 421 over 5GNR AN 411 and/or over WIFI AN 412 and IWF 422. UE 401 requests the eMBB slice from AMF 421 and transfers the slice certificate for the eMBB slice to AMF 421. AMF 421 obtains the cryptography key for the eMBB slice and UE 401 from UDM 423 and decrypts the slice certificate to identify the eMBB slice characteristics for UE 401. AMF

421 retrieves the expected eMBB slice characteristics for UE 401 from NSSF 424, UDM 423, and/or some other database. AMF 421 compares the eMBB slice characteristics from UE 401 to the expected eMBB slice characteristics for correspondence. In this example, the correspondence requires a data match between the values of several attributes in the slice characteristics: user identifier, slice identifier, application identifier, server identifier, RAN type, RAN data rate, RAN latency, SMF identifier, UPF identifier, UPF data rate, UPF latency, and possibly additional data. AMF 421 authorizes UE 401 to use the eMBB slice. AMF 421 selects and signals eMBB SMF 431 to serve UE 401 based on the slice characteristics. SMF 431 selects and signals eMBB UPF 441 to serve UE 401 based on the slice characteristics. AMF 421 signals 5GNR AN 411 and/or IWF 422 to serve UE 401 based on the slice characteristics. AMF 421 signals UE 401 over 5GNR AN 411 and/or AN 412-IWF 422 to use the eMBB slice based on the slice characteristics. UE 401 exchanges eMBB data with eMBB UPF 441 over 5GNR AN 411 and/or AN 412-IWF 422 based on the slice characteristics. UPF 441 exchanges the eMBB data with external systems based on the slice characteristics.

UE 401 requests the URLLC slice from AMF 421 and transfers the slice certificate for the URLLC slice to AMF 421. AMF 421 obtains the cryptography key for the URLLC slice and UE 401 from UDM 423 and decrypts the slice certificate to identify the URLLC slice characteristics for UE 401. AMF 421 retrieves the expected URLLC slice characteristics for UE 401 from NSSF 424, UDM 423, and/or some other database. AMF 421 compares the URLLC slice characteristics from UE 401 to the expected URLLC slice characteristics for correspondence. In this example, the correspondence requires a data match between the values of several attributes in the slice characteristics: user identifier, slice identifier, application identifier, server identifier, RAN type, RAN data rate, RAN latency, SMF identifier, UPF identifier, UPF data rate, UPF latency, and possibly additional data. Thus, the correspondence requires alpha-numeric equality between the values of like attributes. When the attribute values match to show correspondence, AMF 421 authorizes UE 401 to use the URLLC slice. AMF 421 selects and signals URLLC SMF 432 to serve UE 401 based on the slice characteristics. SMF 432 selects and signals URLLC UPF 442 to serve UE 401 based on the slice characteristics. AMF 421 signals 5GNR AN 411 and/or IWF 422 to serve UE 401 based on the slice characteristics. AMF 421 signals UE 401 over 5GNR AN 411 and/or AN 412-IWF 422 to use the URLLC slice based on the slice characteristics. UE 401 exchanges URLLC data with URLLC UPF 442 over 5GNR AN 411 and/or AN 412-IWF 422 based on the slice characteristics. UPF 442 exchanges the URLLC data with external systems based on the slice characteristics.

UE 401 requests the mMTC slice from AMF 421 and transfers the slice certificate for the mMTC slice to AMF 421. AMF 421 obtains the cryptography key for the mMTC slice and UE 401 from UDM 423 and decrypts the slice certificate to identify the mMTC slice characteristics for UE 401. AMF 421 retrieves the expected mMTC slice characteristics for UE 401 from NSSF 424, UDM 423, and/or some other database. AMF 421 compares the mMTC slice characteristics from UE 401 to the expected mMTC slice characteristics for correspondence. In this example, the correspondence requires a data match between the values of several attributes in the slice characteristics: user identifier, slice identifier, application identifier, server identifier, RAN type, RAN data rate, RAN latency, SMF identifier, UPF identifier, UPF data rate, UPF latency, and possibly additional data. When the attribute values match to show correspondence, AMF 421 authorizes UE 401 to use the mMTC slice. AMF 421 selects and signals mMTC SMF 433 to serve UE 401 based on the slice characteristics. SMF 431 selects and signals mMTC UPF 443 to serve UE 401 based on the slice characteristics. AMF 421 signals 5GNR AN 411 and/or IWF 422 to serve UE 401 based on the slice characteristics. AMF 421 signals UE 401 over 5GNR AN 411 and/or AN 412-IWF 422 to use the mMTC slice based on the slice characteristics. UE 401 exchanges URLLC data with mMTC UPF 443 over 5GNR AN 411 and/or AN 412-IWF 422 based on the slice characteristics. UPF 443 exchanges the mMTC data with external systems based on the slice characteristics.

Figure 5:
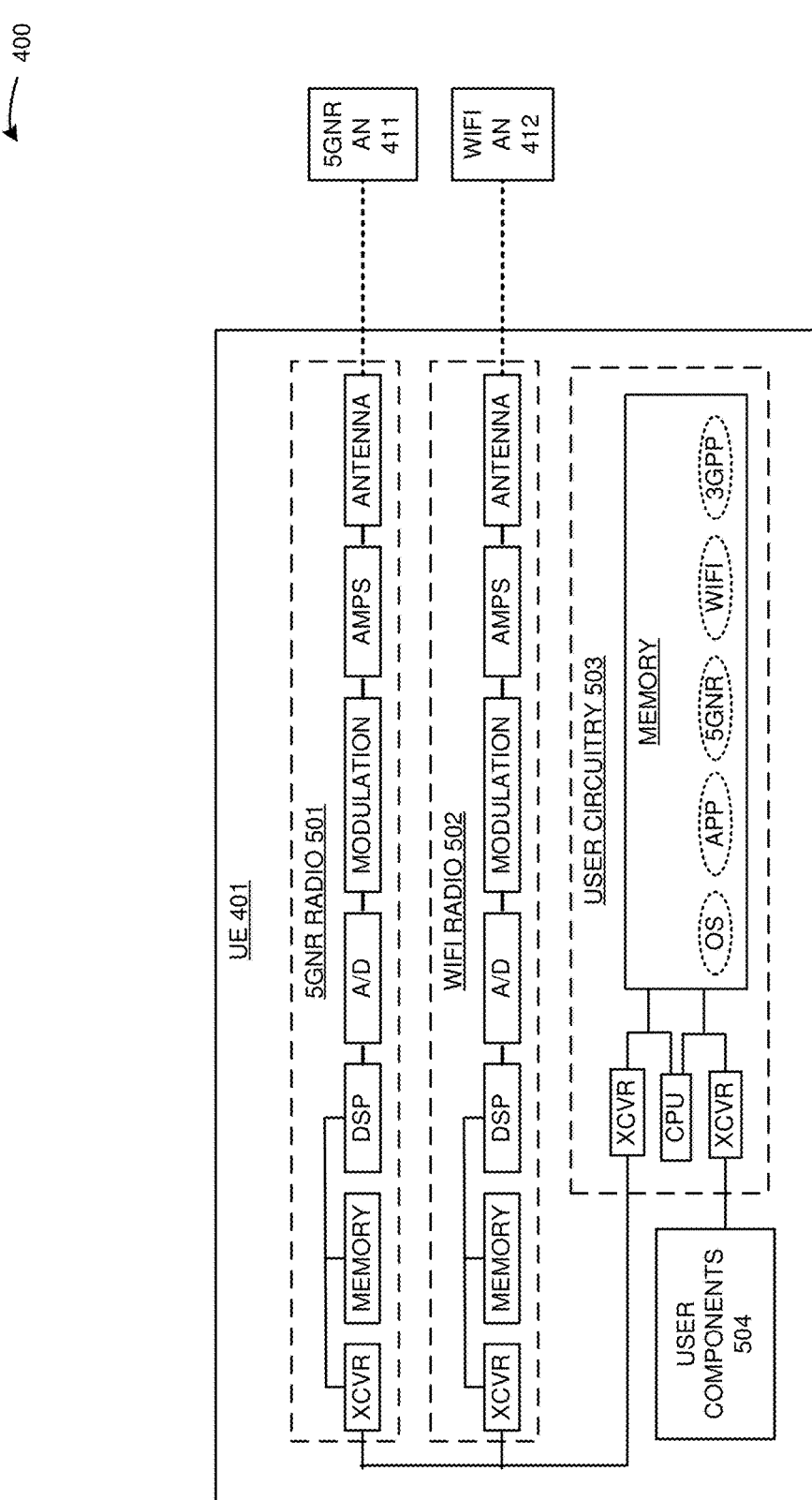
FIG. 5 illustrates an exemplary wireless UE in the 5G communication network.

FIG. 5 illustrates exemplary wireless UE 401 in 5G communication network 400. Wireless UE 401 comprises an example of wireless user devices 101-103, although devices 101-103 may differ. Wireless UE 401 comprises 5GNR radio 501, WIFI radio 502, user circuitry 503, and user components 504. User components 504 comprise sensors, controllers, displays, or some other user apparatus that generates and/or consumes user data. Radios 501-502 each comprise an antenna, amplifiers, filters, modulation, analog-to-digital interfaces, DSP, memory, and transceivers that are coupled over bus circuitry. User circuitry 503 comprises memory, CPU, transceivers (XCVRs) that are coupled over bus circuitry. The memory in user circuitry 503 stores an operating system (OS), user application (APP), 5GNR application (5GNR), WIFI application (WIFI) and network application (3GPP). The transceivers in radios 501-502 are coupled to a transceiver in user circuitry 503. The transceiver in user circuitry 503 is coupled to user components 504. The CPU in user circuitry 503 executes the operating system and applications to exchange network signaling and user data with ANs 411-412 over radios 501-502. The 3GPP application handles slice keys, characteristics, and certificates as described herein.

Figure 6:
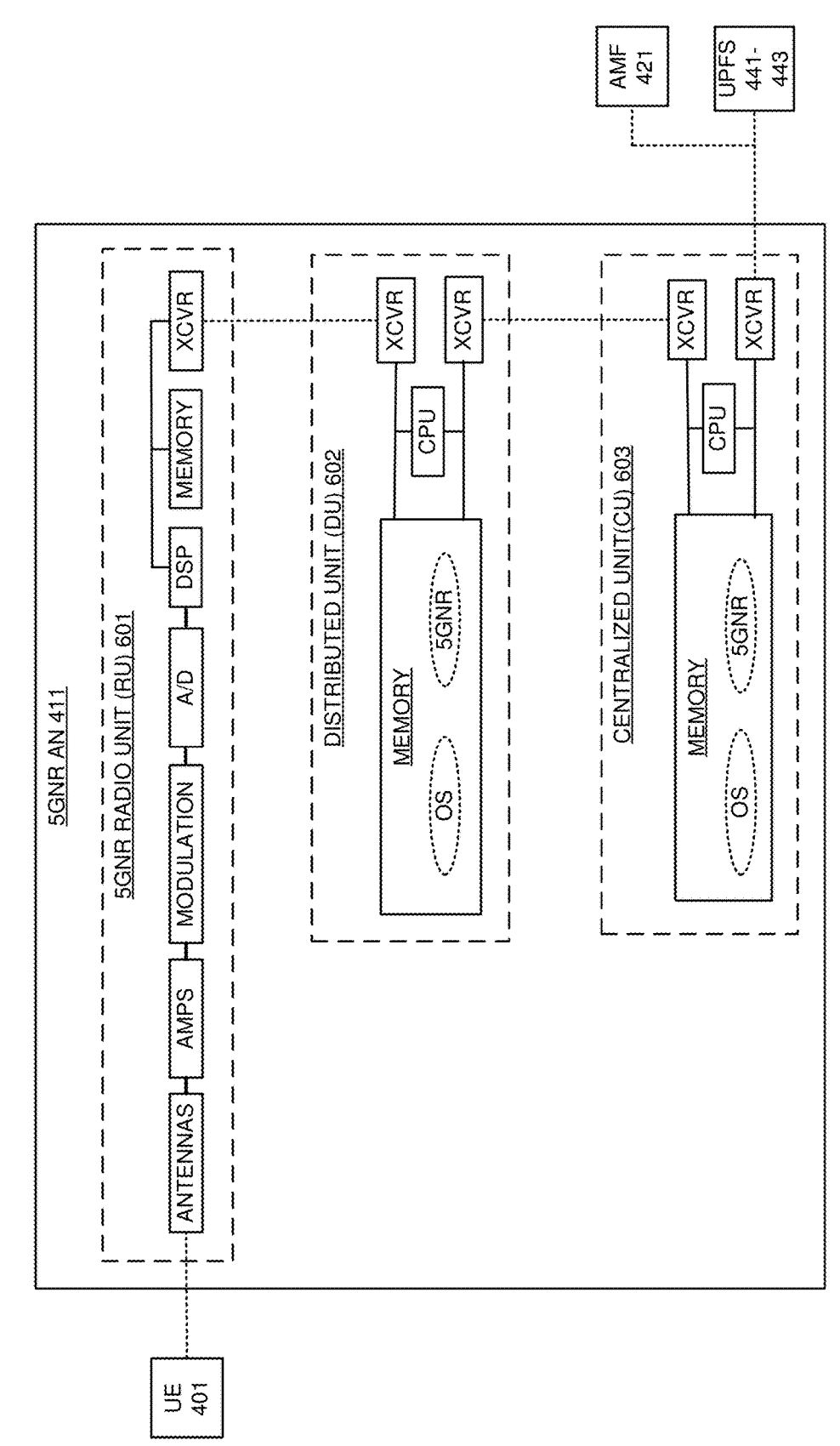
FIG. 6 illustrates an exemplary 5G New Radio (NR) Access Node (AN) in the 5G communication network.

FIG. 6 illustrates exemplary 5G New Radio (NR) Access Node (AN) 411 in 5G communication network 400. 5GNR AN 411 comprises an example of ANs 111-112, although ANs 111-112 may differ. 5GNR AN 411 comprises 5GNR Radio Unit (RU) 601, Distributed Unit (DU) 602, and Centralized Unit (CU) 603. 5GNR RU 601 comprises antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores operating system and 5GNR network applications for physical layer, media access control, and radio link control. CU 603 comprises memory, CPU, and transceivers that are coupled over bus circuitry. The memory in CU 603 stores an operating system and 5GNR network applications for packet data convergence protocol, service data adaption protocol, and radio resource control. The antennas in 5GNR RU 601 are wirelessly coupled to UE 401 over 5GNR links. Transceivers in 5GNR RU 601 are coupled to transceivers in DU 602. Transceivers in DU 602 are coupled to transceivers in CU 603. Transceivers in CU 603 are coupled AMF 421 and UPF 424. The DSP and CPU in RU 601, DU 602, and CU 603 execute the radio applications, operating systems, and network applications to exchange data and signaling with UE 401, AMF 421, and UPFs 441-443.

FIG. 7 illustrates an exemplary IEEE 802.11 (WIFI) AN 412 in 5G communication network 400. WIFI AN 412 comprises an examples of ANs 111-112, although ANs 111-112 may differ. WIFI AN 412 comprises WIFI radio 701 and node circuitry 702. WIFI radio 701 comprises antennas, amplifiers, filters, modulation, analog-to-digital interfaces, DSP, memory, and transceivers that are coupled over bus circuitry. Node circuitry 702 comprises memory, CPU, user interfaces and components, and transceivers that are coupled over bus circuitry. The memory in node circuitry 702 stores an operating system and network applications for WIFI. The antennas in WIFI radio 701 are wirelessly coupled to UE 401 over a WIFI link. Transceivers in WIFI radio 701 are coupled to transceivers in node circuitry 702. Transceivers in node circuitry 702 are coupled to transceivers in IWF 422. The CPU in node circuitry 702 executes the operating system and network applications to exchange signaling and data between UE 410 and IWF 422.

Figure 8:
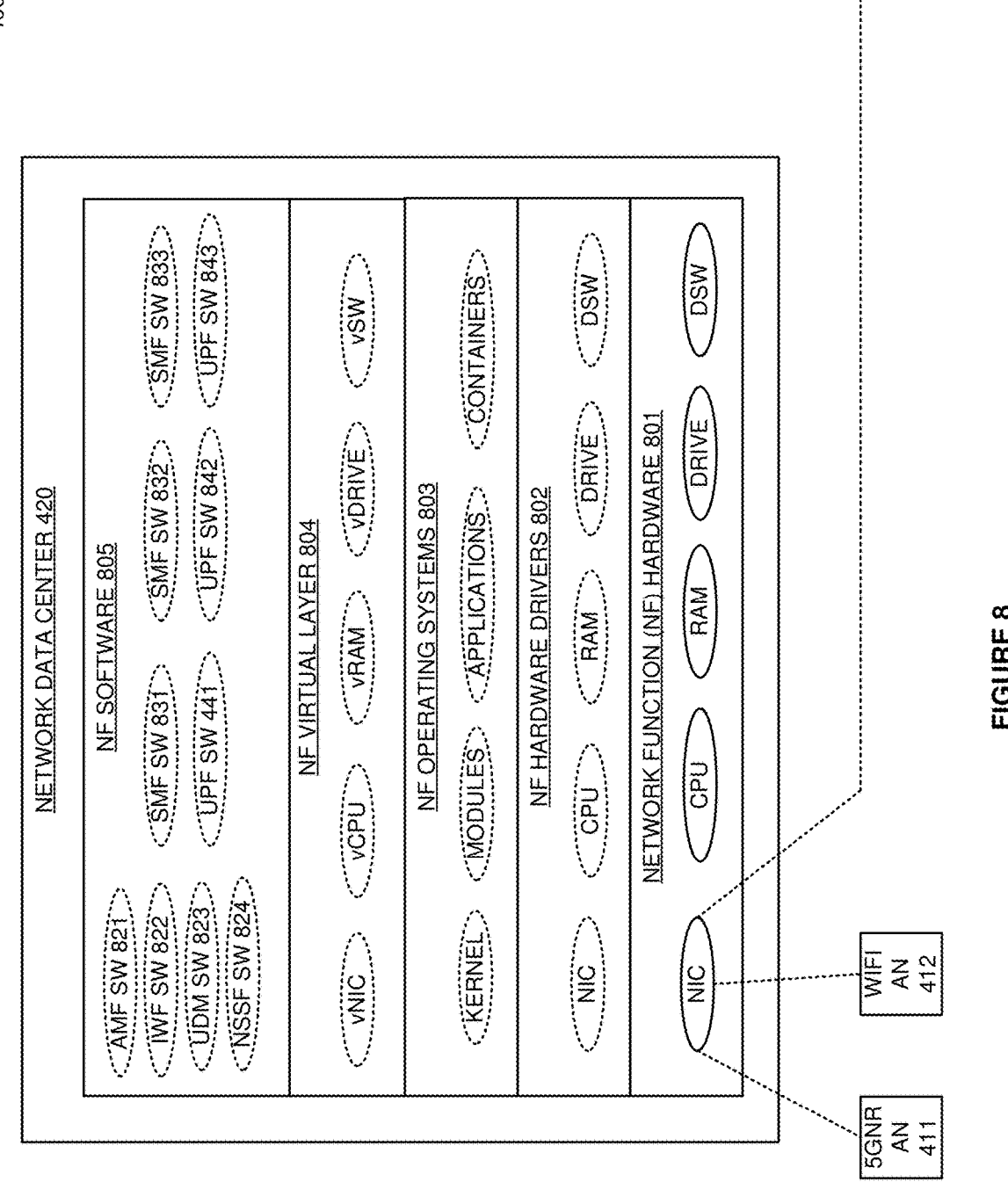
FIG. 8 illustrates an exemplary data center in the 5G communication network.

FIG. 8 illustrates exemplary data center 420 in 5G communication network 400. Network data center 420 comprises an example of network user plane 114 and network control plane 115, although planes 114-115 may differ. Network data center 420 comprises Network Function (NF) hardware 801, NF hardware drivers 802, NF operating systems 803, NF virtual layer 804, and NF Software (SW) 805. NF hardware 801 comprises Network Interface Cards (NICs), CPU, RAM, Flash/Disk Drives (DRIVE), and Data Switches (DSW). NF hardware drivers 802 comprise software that is resident in the NIC, CPU, RAM, DRIVE, and DSW. NF operating systems 803 comprise kernels, modules, and applications that form containers for virtual layer and NF software execution. NF virtual layer 804 comprises vNIC, vCPU, vRAM, vDRIVE, and vSW. NF SW 805 comprises AMF SW 821, IWF SW 822, UDM SW 823, NSSF SW 824, SMF SW 831-833, and UPF SW 841-843. Other NF SW like Network Repository Function (NRF) SW are typically present but are omitted for clarity. Network data center 420 may be located at a single site or be distributed across multiple geographic locations. The NIC in NF hardware 801 are coupled to ANs 411-412 and external data systems. NF hardware 801 executes NF hardware drivers 802, NF operating systems 803, NF virtual layer 804, and NF SW 805 to form and operate AMF 421, IWF 422, UDM 423, NSSF 424, SMFs, 431-433, and UPFs 441-443.

Figure 9:
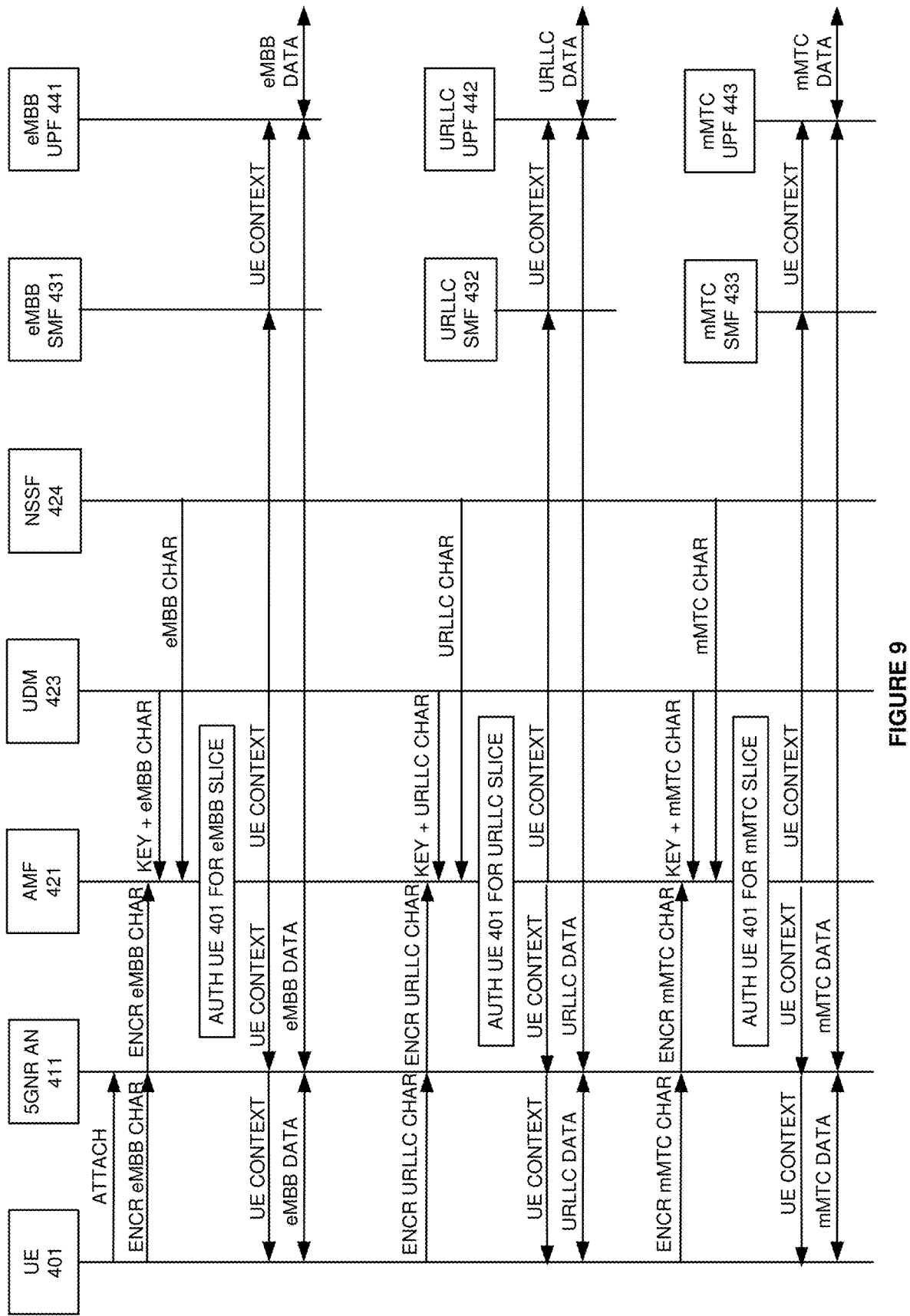
FIG. 9 illustrates an exemplary operation of the 5G communication network to serve the wireless UE over the wireless network slices that have the encrypted slice certificates that indicate the slice characteristics.

FIG. 9 illustrates an exemplary operation of 5G communication network 400 to serve wireless UE 401 over the wireless network slices that have the encrypted slice certificates that indicate the slice characteristics. The operation may vary in other examples. UE 401 attaches to 5GNR AN 411. UE 401 requests the eMBB slice and transfers an eMBB slice certificate to AMF 421 over 5GNR AN 411. The eMBB slice certificate has encrypted eMBB characteristics (ENCR eMBB CHAR) for UE 401. AMF 421 obtains the cryptography key for the eMBB slice and UE 401 from UDM 423 and some eMBB slice characteristics. AMF 421 decrypts the slice certificate to identify the eMBB slice characteristics for UE 401. AMF 421 retrieves additional eMBB slice characteristics for UE 401 from NSSF 424. AMF 421 compares the eMBB slice characteristics from UE 401 to the expected eMBB slice characteristics. When the eMBB slice characteristics match, AMF 421 authorizes UE 401 to use the eMBB slice. AMF 421 signals UE context for the eMBB slice and UE 401 to eMBB SMF 431. SMF 431 signals UE context for the eMBB slice and UE 401 to eMBB UPF 441. AMF 421 signals UE context for the eMBB slice and UE 401 to 5GNR AN 411. AMF 421 signals UE context for the eMBB slice and UE 401 to UE 401 over 5GNR AN 411. UE 401 exchanges eMBB data with eMBB UPF 441 over 5GNR AN 411 based on the UE context for the eMBB slice and UE 401. UPF 441 exchanges the eMBB data with external systems based on the UE context for the eMBB slice and UE 401. UE 401 transfers the slice request and slice certificate and may then exchange eMBB data without additional authentication hashing and associated signaling.

UE 401 now requests the URLLC slice and transfers a URLLC slice certificate to AMF 421 over 5GNR AN 411. The URLLC slice certificate has encrypted URLLC characteristics for UE 401. AMF 421 obtains the cryptography key for the URLLC slice and UE 401 from UDM 423 and some URLLC slice characteristics. AMF 421 decrypts the slice certificate to identify the URLLC slice characteristics for UE 401. AMF 421 retrieves additional URLLC slice characteristics for UE 401 from NSSF 424. AMF 421 compares the URLLC slice characteristics from UE 401 to the expected URLLC slice characteristics. When the URLLC slice characteristics match, AMF 421 authorizes UE 401 to use the URLLC slice. AMF 421 signals UE context for the URLLC slice and UE 401 to URLLC SMF 432. SMF 421 signals UE context for the URLLC slice and UE 401 to URLLC UPF 442. AMF 421 signals UE context for the URLLC slice and UE 401 to 5GNR AN 411. AMF 421 signals UE context for the URLLC slice and UE 401 to UE 401 over 5GNR AN 411. UE 401 exchanges URLLC data with URLLC UPF 442 over 5GNR AN 411 based on the UE context for the URLLC slice and UE 401. UPF 442 exchanges the URLLC data with external systems based on the UE context for the URLLC slice and UE 401. UE 401 transfers the slice request and slice certificate and may then exchange URLLC data without additional authentication hashing and associated signaling.

UE 401 now requests the mMTC slice and transfers an mMTC slice certificate to AMF 421 over 5GNR AN 411. The mMTC slice certificate has encrypted mMTC characteristics for UE 401. AMF 421 obtains the cryptography key for the mMTC slice and UE 401 from UDM 423 and some mMTC slice characteristics. AMF 421 decrypts the slice certificate to identify the mMTC slice characteristics for UE 401. AMF 421 retrieves additional mMTC slice characteristics for UE 401 from NSSF 424. AMF 421 compares the mMTC slice characteristics from UE 401 to the expected mMTC slice characteristics. When the mMTC slice characteristics match, AMF 421 authorizes UE 401 to use the mMTC slice. AMF 421 signals UE context for the mMTC slice and UE 401 to mMTC SMF 433. SMF 421 signals UE context for the mMTC slice and UE 401 to mMTC UPF 443. AMF 421 signals UE context for the mMTC slice and UE 401 to 5GNR AN 411. AMF 421 signals UE context for the mMTC slice and UE 401 to UE 401 over 5GNR AN 411. UE 401 exchanges mMTC data with mMTC UPF 443 over 5GNR AN 411 based on the UE context for the mMTC slice and UE 401. UPF 443 exchanges the mMTC data with external systems based on the UE context for the mMTC slice and UE 401. UE 401 transfers the slice request and slice certificate and may then exchange mMTC data without additional authentication hashing and associated signaling.

Figure 10:
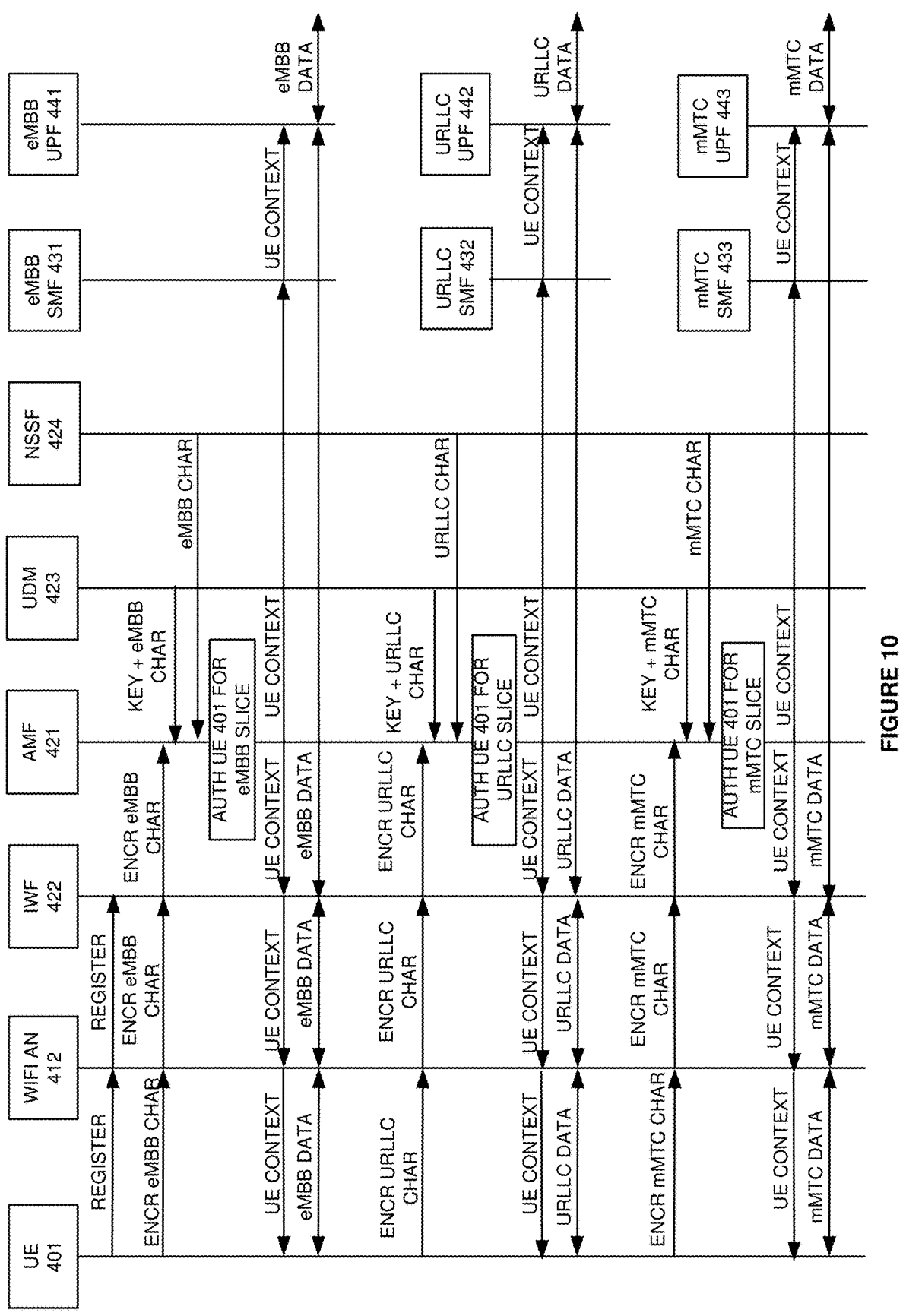
FIG. 10 illustrates an exemplary operation of the 5G communication network to serve the wireless UE over the wireless network slices that have the encrypted slice certificates that indicate the slice characteristics.

FIG. 10 illustrates an exemplary operation of 5G communication network 400 to serve wireless UE 401 over the wireless network slices that have the encrypted slice certificates that indicate the slice characteristics. The operation may vary in other examples. UE 401 attaches to WIFI AN 412 and registers with IWF 422 over WIFI AN 412. UE 401 requests the eMBB slice from AMF 421 and transfers an eMBB slice certificate to AMF 421 over WIFI AN 412 and IWF 422. The eMBB slice certificate has encrypted eMBB characteristics (ENCR eMBB CHAR) for UE 401. AMF 421 obtains the cryptography key for the eMBB slice and UE 401 from UDM 423 and some eMBB slice characteristics.

AMF 421 decrypts the slice certificate to identify the eMBB slice characteristics for UE 401. AMF 421 retrieves additional eMBB slice characteristics for UE 401 from NSSF 424. AMF 421 compares the eMBB slice characteristics from UE 401 to the expected eMBB slice characteristics. When the eMBB slice characteristics match, AMF 421 authorizes UE 401 to use the eMBB slice. AMF 421 signals UE context for the eMBB slice and UE 401 to eMBB SMF 431. SMF 431 signals UE context for the eMBB slice and UE 401 to eMBB UPF 441. AMF 421 signals UE context for the eMBB slice and UE 401 to IWF 422. AMF 421 signals UE context for the eMBB slice and UE 401 to UE 401 over IWF 422 and WIFI AN 412. UE 401 exchanges eMBB data with eMBB UPF 441 over WIFI AN 412 and IWF 422 based on the UE context for the eMBB slice and UE 401. UPF 441 exchanges the eMBB data with external systems based on the UE context for the eMBB slice and UE 401. UE 401 transfers the slice request and slice certificate and may then exchange eMBB data without additional authentication hashing and associated signaling.

UE 401 now requests the URLLC slice and transfers a URLLC slice certificate to AMF 421 over WIFI AN 412 and IWF 422. The URLLC slice certificate has encrypted URLLC characteristics for UE 401. AMF 421 obtains the cryptography key for the URLLC slice and UE 401 from UDM 423 and some URLLC slice characteristics. AMF 421 decrypts the slice certificate to identify the URLLC slice characteristics for UE 401. AMF 421 retrieves additional URLLC slice characteristics for UE 401 from NSSF 424. AMF 421 compares the URLLC slice characteristics from UE 401 to the expected URLLC slice characteristics. When the URLLC slice characteristics match, AMF 421 authorizes UE 401 to use the URLLC slice. AMF 421 signals UE context for the URLLC slice and UE 401 to URLLC SMF 432. SMF 421 signals UE context for the URLLC slice and UE 401 to URLLC UPF 442. AMF 421 signals UE context for the URLLC slice and UE 401 to IWF 422. AMF 421 signals UE context for the URLLC slice and UE 401 to UE 401 over IWF 422 and WIFI AN 412. UE 401 exchanges URLLC data with URLLC UPF 442 over WIFI AN 412 and IWF 422 based on the UE context for the URLLC slice and UE 401. UPF 442 exchanges the URLLC data with external systems based on the UE context for the URLLC slice and UE 401. UE 401 transfers the slice request and slice certificate and may then exchange URLLC data without additional authentication hashing and associated signaling.

UE 401 now requests the mMTC slice and transfers an mMTC slice certificate to AMF 421 over 5GNR AN 411. The mMTC slice certificate has encrypted mMTC characteristics for UE 401. AMF 421 obtains the cryptography key for the mMTC slice and UE 401 from UDM 423 and some mMTC slice characteristics. AMF 421 decrypts the slice certificate to identify the mMTC slice characteristics for UE 401. AMF 421 retrieves additional mMTC slice characteristics for UE 401 from NSSF 424. AMF 421 compares the mMTC slice characteristics from UE 401 to the expected mMTC slice characteristics. When the mMTC slice characteristics match, AMF 421 authorizes UE 401 to use the mMTC slice. AMF 421 signals UE context for the mMTC slice and UE 401 to mMTC SMF 433. SMF 421 signals UE context for the mMTC slice and UE 401 to mMTC UPF 443. AMF 421 signals UE context for the mMTC slice and UE 401 to IWF 422. AMF 421 signals UE context for the mMTC slice and UE 401 to UE 401 over WIFI AN 412 and IWF 422. UE 401 exchanges mMTC data with mMTC UPF 443 over WIFI AN 412 and IWF 422 based on the UE context for the mMTC slice and UE 401. UPF 443 exchanges the mMTC data with external systems based on the UE context for the mMTC slice and UE 401. UE 401 transfers the slice request and slice certificate and may then exchange mMTC data without additional authentication hashing and associated signaling.

The wireless data network circuitry described above comprises computer hardware and software that form special-purpose network circuitry to serve wireless UEs over wireless network slices that have encrypted slice certificates that have slice characteristics. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to serve wireless UEs over wireless network slices that have encrypted slice certificates that have slice characteristics.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method comprising:
   generating, by a user device, a slice certificate having one or more slice characteristics for a wireless network slice;
   encrypting, by the user device, the slice certificate with a wireless network key that the user device is configured with, wherein encrypting the slice certificate encrypts the one or more slice characteristics for the wireless network slice;

wirelessly transferring, by the user device, the encrypted slice certificate having the one or more encrypted slice characteristics to a wireless access node, and in response, wirelessly receiving user context for the wireless network slice from the wireless access node, wherein the wireless access node provides the encrypted slice certificate to a network control plane and the network control plane decrypts the encrypted slice certificate, authorizes the user device to use the wireless network slice based on one or more decrypted slice characteristics of the decrypted slice certificate, and provides the user context to the user device via the wireless access node; and wirelessly exchanging, by the user device, wireless network slice data with the wireless access node based on the user context for the wireless network slice.

2. The method of claim 1 wherein the one or more slice characteristics indicate a slice identifier.

3. The method of claim 1 wherein the one or more slice characteristics indicate user application information.

4. The method of claim 1 wherein the one or more slice characteristics indicate Radio Access Network (RAN) information.

5. The method of claim 1 wherein the one or more slice characteristics indicate User Plane Function (UPF) information.

6. The method of claim 1 wherein the one or more slice characteristics indicate Session Management Function (SMF) information.

7. The method of claim 1 wherein the wireless network slice comprises a massive Machine Type Communication (mMTC) slice.

8. The method of claim 1 wherein the wireless network slice comprises an Ultra Reliable Low Latency Communication (URLLC) slice.

9. The method of claim 1 wherein the wireless network slice comprises an enhanced Mobile Broadband (eMBB) slice.

10. A method of operating a sensor to use a massive Machine Type Communication (mMTC) network slice, the method comprising:

wirelessly transferring, by the sensor, encrypted mMTC slice characteristics for the mMTC network slice to a wireless communication network that decrypts and validates the encrypted mMTC slice characteristics, and in response, wirelessly transfers user context for the mMTC wireless network slice to the sensor; and wirelessly receiving, by the sensor, the user context for the mMTC network slice from the wireless communication network; and wirelessly transferring, by the sensor, sensor data to the mMTC network slice over the wireless communication network based on the user context.

11. The method of claim 10 wherein the wireless communication network compares the decrypted mMTC slice characteristics to expected mMTC slice characteristics to validate the encrypted mMTC slice characteristics.

12. A wireless communication device comprising:

a data processing system and a radio;

the data processing system configured to;

generate a slice certificate having one or more slice characteristics for a wireless network slice; and encrypt the slice certificate with a wireless network key that the wireless communication device is configured with, wherein encrypting the slice certificate encrypts the one or more slice characteristics for the wireless network slice; and the radio configured to:

wirelessly transfer the encrypted slice certificate having the one or more encrypted slice characteristics to a wireless access node, wherein the wireless access node provides the encrypted slice certificate to a network control plane and the network control plane decrypts the encrypted slice certificate and authorizes the wireless communication device to use the wireless network slice based on one or more decrypted slice characteristics of the decrypted slice certificate;

in response, wirelessly receive user context for the wireless network slice from the wireless access node, wherein the network control plane provides the user context to the wireless communication device via the wireless access node; and wirelessly exchange wireless network slice data with the wireless access node based on the user context for the wireless network slice.

13. The wireless communication device of claim 12 wherein the one or more slice characteristics indicate a slice identifier.

14. The wireless communication device of claim 12 wherein the one or more slice characteristics indicate user application information.

15. The wireless communication device of claim 12 wherein the one or more slice characteristics indicate Radio Access Network (RAN) information.

16. The wireless communication device of claim 12 wherein the one or more slice characteristics indicate User Plane Function (UPF) information.

17. The wireless communication device of claim 12 wherein the one or more slice characteristics indicate Session Management Function (SMF) information.

18. The wireless communication device of claim 12 wherein the wireless network slice comprises a massive Machine Type Communication (mMTC) slice.

19. The wireless communication device of claim 12 wherein the wireless network slice comprises an Ultra Reliable Low Latency Communication (URLLC) slice.

20. The wireless communication device of claim 12 wherein the wireless network slice comprises an enhanced Mobile Broadband (eMBB) slice.

* * * * *